United States Patent [19]
Kovacevic

[11] Patent Number: 5,961,209
[45] Date of Patent: Oct. 5, 1999

[54] FEED SCREW

[75] Inventor: Miodrag Kovacevic, Windsor, Canada

[73] Assignee: Royal Feed Screws, Inc., Canada

[21] Appl. No.: 08/873,345

[22] Filed: Jun. 11, 1997

[51] Int. Cl.$^6$ ..................................................... B29B 7/14
[52] U.S. Cl. ............................................. 366/89; 366/90
[58] Field of Search ............................. 366/90, 89, 88, 366/81, 80, 79, 318, 322, 323, 324; 425/208

[56] References Cited

U.S. PATENT DOCUMENTS

| | | | |
|---|---|---|---|
| 3,006,029 | 10/1961 | Saxton . | |
| 3,271,819 | 9/1966 | Lacher | 366/89 |
| 3,652,064 | 3/1972 | Lehnen et al. | 366/90 |
| 3,867,079 | 2/1975 | Kim | 366/90 |
| 3,941,535 | 3/1976 | Street | 366/90 |
| 4,085,461 | 4/1978 | Mallefer | 366/90 |
| 4,107,788 | 8/1978 | Anders | 366/81 |
| 4,128,341 | 12/1978 | Hsu | 366/89 |
| 4,154,536 | 5/1979 | Sokolow | 366/90 |
| 4,171,196 | 10/1979 | Maillefer | 366/90 |
| 4,173,417 | 11/1979 | Kruder | 366/89 |
| 4,285,600 | 8/1981 | Kruder | 366/89 |
| 4,720,254 | 1/1988 | Wood | 425/208 |
| 4,944,906 | 7/1990 | Colby et al. | 366/89 |
| 5,035,509 | 7/1991 | Kruder | 366/89 |
| 5,044,759 | 9/1991 | Gagliani | 366/88 |
| 5,088,914 | 2/1992 | Brambilla | 366/89 |
| 5,141,326 | 8/1992 | Eshima | 366/89 |
| 5,215,764 | 6/1993 | Davis et al. | 425/208 |
| 5,318,357 | 6/1994 | Colby et al. | 366/81 |
| 5,599,092 | 2/1997 | Christie | 366/90 |

*Primary Examiner*—Tony G. Soohoo
*Attorney, Agent, or Firm*—Young & Basile, P.C.

[57] ABSTRACT

An improved feed screw for injection molding machines has a metering section adjacent to the outlet having primary flights formed by a helical thread. The primary flights form primary channels therebetween for passage of the material. The primary channels are intersected by mixing flights formed by another helical thread having a hook shaped starting point extending from a main flight at the start of the metering section that continues in a general alignment with the primary flights. The mixing flights divide the primary channel into two secondary channels. The mixing flights include alternating oriented angular notches cut therethrough to provide passageway for the material between the two secondary channels to move in a general serpentine path.

12 Claims, 1 Drawing Sheet

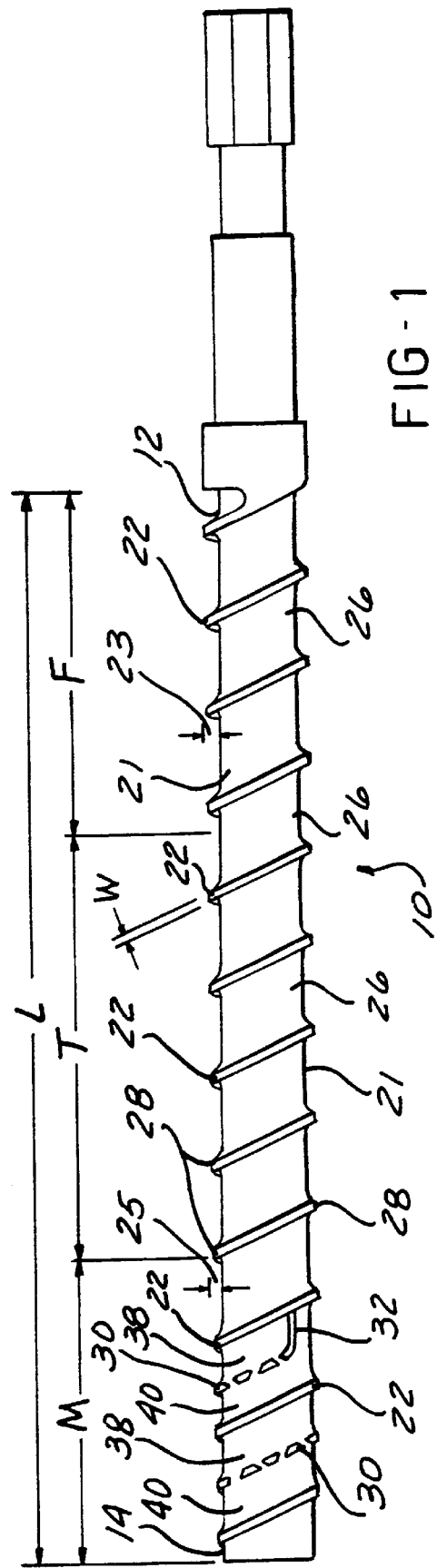
FIG-1
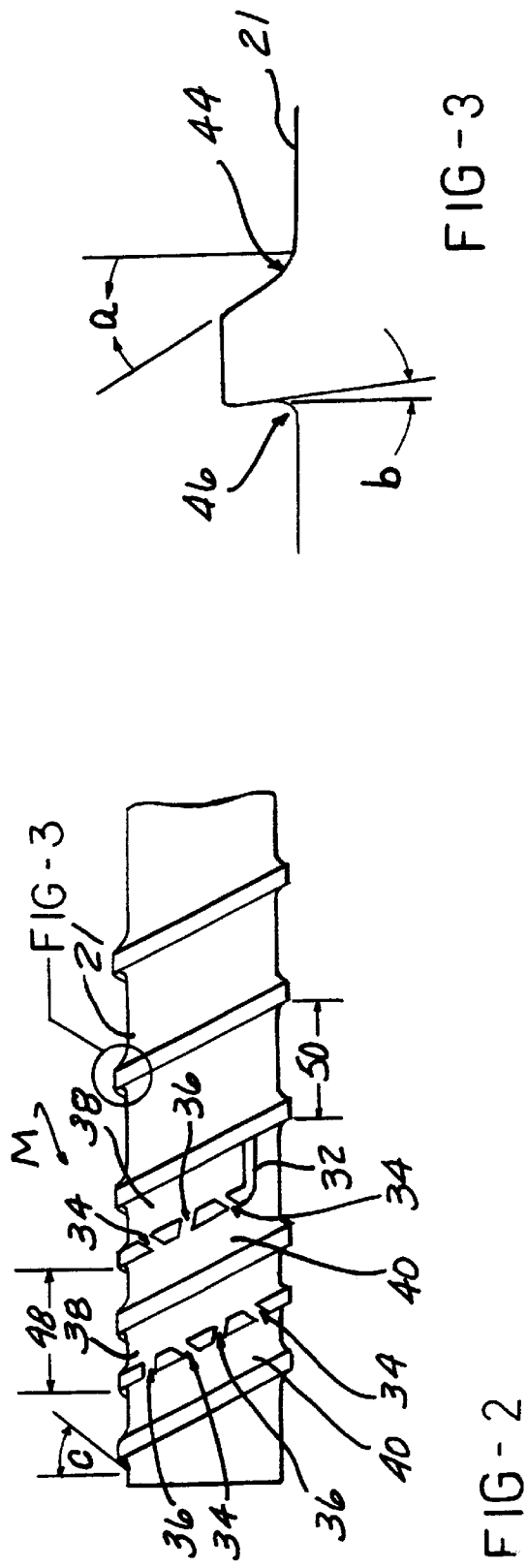
FIG-2
FIG-3

൦# FEED SCREW

FIELD OF THE INVENTION

This invention relates to a feed screw for an injection and extruder machine.

BACKGROUND OF THE INVENTION

Typically in an extrusion and injection molding machine, a screw is positioned in a barrel to mix and convey resinous material from an inlet feed at one end of the barrel to an outlet discharged point at a distal end of the barrel. A typical configuration of the screw within the barrel includes a feed section at the inlet end, a transition section, and a metering section at the discharge end. The feed section of the screw conveys the resin forward in the barrel by the rotation of the screw. The resin is partially melted in this section. The resin then moves into the transition section wherein the diameter of the root of the screw gradually increases to compress and further heat the resin. The final section is the metering section which includes a constant large root diameter to completely melt the material. The screw further includes a helical thread (or flights) to mix and transport the resin forward through the barrel as the screw rotates.

Because the barrel is heated, various configurations for the screw have been offered to provide complete mixing of the material while preventing overheating. Some screw designs alter the transition section such that a secondary flight or protuberances are formed to interrupt the continuous path of the resin material such that mixing and melting of the material is further promoted.

Although the prior art has provided effective screws, it is desirable to provide additional improvements. A consideration for an improved screw design is one that does not allow the resin material to hang up on sharp corners or edges so that flow is not blocked. Another consideration includes providing a free flow path for the resin in the metering section where the root diameter is large to prevent burning of the material. A further consideration is to design a screw that allows a wider range of materials that can employ the injection and extruder machine, especially heat sensitive materials with high viscosity.

SUMMARY OF THE INVENTION

It is the intention of this invention to provide an improved screw for an injection molding machine such that mixing is improved to raise the melting point of the material so that the heating temperature can be raised without burning or discoloring the material. It is further an intention of this invention to provide an improved mixing ability which will also lower the backpressure of the injection molding machine pump. This is advantageous because operating at a lower backpressure results in a longer machine life.

The invention provides a screw having a metering section that follows a feed and transition sections. A helical thread or flights extends through the three sections. A primary channel is formed between the flights to mix and convey the resin material to a discharge point. In the metering section, a secondary helical screw thread is formed between the primary helical screw flights to intersect the primary channel and form two secondary channels. The secondary helical screw thread is not contiguous, but includes notches therein to define cross-over passageways to form mixing flights. The mixing flights facilitate the mixing of the material so that a portion of the material can pass through the passageways from one secondary channel to the adjacent secondary channel. The cross-over notches are also angled to facilitate the cross-over movement of the material through the notches to diagonally traverse the secondary helical flights. As a result, the material traveling between the secondary channels forms a serpentine path so that the mixing is increasingly thorough as the material advances down the axial length of the screw.

Further, the depth of the secondary channels between primary helical flights are held constant and are narrower in the metering section than the primary channel in the feed section. The depth of the primary channel in the transition section gradually decreases from the depth in the feed section to the constant depth of the secondary channels in the metering section.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 1 is a side elevational view of a feed screw according to the present invention;

FIG. 2 is a side elevational view of the metering section of the present invention; and FIG. 3 is an exploded view of the encircled area of FIG. 2.

DESCRIPTION OF THE PREFERRED EMBODIMENT

Referring now to the drawings, FIG. 1 illustrates a feed screw 10 for an extrusion machine having an inlet end 12, an outlet end 14 and encompassing three sections of the screw including a feed section (F), a transitional section (T), and a metering section (M). A helical thread 22 defines primary flights to form the primary channel 26 therebetween for the flow of the extrusion material to advance from the inlet end 12 to the outlet end 14 as the screw 10 rotates within a barrel (not shown). The helical screw thread or flights 22 extends along the axial length of the screw 10 to define a continuous helical primary channel 26 therebetween having a depth determined by the difference of the root 21 diameter of the screw 10 and the peripheral edge 28 of the helical flights 22. In the illustrated embodiment, the width (W) of the flight or thread 22 is approximately 0.550. Essentially, the combination of the root diameter and plus the peripheral edge 28 of the helical flights 22 will be constant along the entire axial length of the screw 10. Generally, the root 21 diameter in the feed section (F) will be smaller than the root diameter in the metering section (M). The root 21 diameter will gradually increase from the diameter of a feed section (F) to the diameter of the metering section (M). As a result, the depth of the channel 26 between the helical thread or flights 22 forces the material to be closer to the heater band at the barrel causing a high percentage of the polymer to be melted by the time the polymer enters the metering section (M). The depth of the channels 26, 38 and 40 in the metering section (M) is the shallowest of the three sections, forcing the material to be in close proximity to the heating source. As an example in the illustrated embodiment, the depth of channel 26 in the feed section (F) is 0.562 mm at 23 while the depth of secondary channels 38 and 40 is 0.225 mm at 25. The root diameter at these locations is 4.184±0.005 mm and 4.848±0.005 mm respectively. The improvement of the feed screw 10 is in the metering section (M) of the screw 10. These improvements will be discussed hereinafter.

The continuous primary channel 26 is intersected by a mixing helical thread or flights 30 in the metering section (M) of the feed screw 10. The mixing thread 30 has a starting point 32 defined by a generally hook-shaped portion traversely extending across a portion of the primary channel 26 from the first primary flight 22 in the metering section (M). The mixing thread 30 then extends in the direction of the primary helical thread 22. Looking at FIG. 2, the starting point 32 of the mixing flights 30 blocks a portion of the primary channel 26 to funnel the material into the remaining portion of the primary channel 26.

The mixing flights 30 continue around the remaining portion of the screw 10 in general alignment with the main helical flights. The mixing helical flights 30 divide the primary channel 26 into two secondary channels 38 and 40. Unlike the primary helical flights 22, the mixing helical flights 30 are not defined by a continuous thread. Notches 34 and 36 are formed to a depth of the channel in the mixing flight or thread 30. Therefore, there is a clear path without damming between the secondary channels 38 and 40. The notches 34 and 36 provide passageways for the flow of the material to enhance the mixing thereof. The notches 34 and 36 further provide relief for the material by providing a larger section for movement of material. As the result of a larger area for the material, backpressure is lowered on the machine pump (not shown) so that the pump operates at a lower pressure. The free flow of the material through the notches 34 and 36 allows the screw 10 to run at high rpms without generating excessive shear heat. As a result material degradation is eliminated or limited. This is especially useful in processing amorphous materials such as polycarbonate (PC), chlorovinyl polyvinyl chloride (CVPVC), or acrylonitrile-butadiene styrene (ABS).

The notches 34 and 36 of the mixing flights 30 are angled such that they avoid dead spots or hang-up areas where the material can collect and cause thermal degradation. The direction of the notches 34 and 36 promote forward movement of the material through the secondary channels 38 and 40. The first notch 34 adjacent the starting point 32 of the mixing flights 30 directs a portion of the material to the first secondary channel 38 formed downstream from the starting point of the mixing flights 30. The adjacent notch 36 downstream from the first notch 34 is directed diagonally opposite from the first notch 34 so that the material flows in the direction of the second secondary channel 40. The first notch is referred to as the inflow notch 34 and the next adjacent notch is referred to as the outflow notch 36. The subsequent notches alternate between inflow 34 and outflow 36 notches so that the material can move in a S-shaped or serpentine path between the two secondary channels 38 and 40. This path creates a process of separating and recombining the material to provide high volume mixing.

As can be seen in FIG. 2, although the mixing flight 30 is aligned with the primary flight 24, they are not perfectly parallel to each other. As seen in the illustrated embodiment shown in FIG. 2, the distance between the primary flights 24 in the metering section (M) at 48 is 1.75 mm, while the distance between the mixing flights 30 in the metering section (M) at 50 is 2.00 mm. Therefore, the second secondary channel 40 gets increasingly narrower at the end of the metering section (M) while the first secondary channel 38 gets increasingly wider.

FIG. 3 illustrates the typical undercut of the invention for a thread relative to the bore or root 21 of one of the flights 24 and 30. As can be seen the undercut 42 has a curvature relative to the radius of the root or bore 21 and having a forward edge having a 30° angle (a) to promote the forward movement of the material. The rounded edges of the flights 24 and 30 adjacent to the root 21 prevent material from hanging up on the threads which would cause the material to collect and cause thermal degradation or color changes thereof. In the illustrated embodiment shown in FIG. 3, the forward corner 44 is defined by the equation 1/2 R (R=radius) and the rearward corner 46 is defined by the equation 1/8 R. The angle (b) of each flight relative to the root 21 is 5°, while angle (c) is 45°. Further, dimensions of the illustrated embodiment include a length of the feed section (F) of 33.4 mm, a length of the transition section (T) of 53.0 mm and a length of the metering section (M) of 19.6 mm for a total axial travel length of the material of 106.0 mm. Therefore, the metering section (M) is less than 1/5 the axial length of travel. For other application, other dimensions may be used.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A screw for rotatable mounting in a barrel of an extrusion machine for extruding material, said screw comprising:

a screw root having an axial length with an inlet end and an outlet end;

a primary helical thread radially extending from the screw root and defining a primary channel therebetween; said primary helical thread extending the axial length;

a metering section along said screw root and located adjacent said outlet end;

a mixing helical thread radially extending from the screw root and intersecting the primary channel in the metering section to form a pair of adjacent secondary channels; and at least two adjacent notches intersecting the mixing helical thread to provide passageways between the secondary channels, said each notch angled in an alternating direction relative to a previous notch for moving the material in a serpentine path in the passageways.

2. The screw as defined in claim 1, wherein the mixing helical thread has an extension portion traversing a portion of the primary channel and another portion extends in alignment with the primary helical thread.

3. The screw as defined in claim 2, wherein the depth of the mixing helical thread is the same as the depth of the primary helical thread.

4. The screw as defined in claim 1, wherein the notches extend to the screw root.

5. The screw as defined in claim 1, wherein the metering section is downstream from a feed section.

6. The screw as defined in claim 5, wherein the secondary channels have a depth less than the primary channel in the feed section.

7. The screw as defined in claim 1, wherein the distance between adjacent mixing flights is greater than the distance between adjacent primary flights in the metering section.

8. The screw as defined in claim 1, wherein the primary helical thread has the same angle relative to the screw root as the mixing helical thread.

9. The screw as defined in claim 1, wherein a series of notches intersect the mixing helical thread to the outlet end to form alternating in-flow and out-flow passageways.

10. An improved feed screw having an axial length for rotatable mounting in a barrel of an extrusion machine, the feed screw having an inlet end for receiving material and a discharge end, the feed screw including a feed section at the inlet end followed by a transition section and then followed by a metering section adjacent the discharge end, the feed screw having a continuous helical thread extending the axial length and forming a continuous primary channel therebetween, wherein the improvement comprises:

a mixing helical thread starting in the metering section and extending to the discharge end, said mixing helical thread having angled notches cut therethrough to provide passageways therein, wherein said notches have alternating angle orientations to form alternating in-flow and out-flow passageways.

11. The improved feed screw of claim 10, wherein the mixing helical thread includes a portion that extends across a portion of the primary channel and a second portion bisecting the primary channel into a pair of secondary channels.

12. The improved feed screw of claim 11, wherein the second portion of the mixing helical thread has angled notches cut therethrough to provide passageways between the pair of secondary channels.

* * * * *